US012674723B2

(12) United States Patent
Shibutani et al.

(10) Patent No.: US 12,674,723 B2
(45) Date of Patent: Jul. 7, 2026

(54) SENSOR ELEMENT AND GAS SENSOR

(71) Applicant: NGK INSULATORS, LTD., Nagoya (JP)

(72) Inventors: Kaoru Shibutani, Nagoya (JP); Ryo Onishi, Iwakura (JP)

(73) Assignee: NGK INSULATORS, LTD., Nagoya (JP)

( * ) Notice: Subject to any disclaimer, the term of this patent is extended or adjusted under 35 U.S.C. 154(b) by 302 days.

(21) Appl. No.: 18/604,644

(22) Filed: Mar. 14, 2024

(65) Prior Publication Data

US 2024/0328900 A1    Oct. 3, 2024

(30) Foreign Application Priority Data

Mar. 31, 2023    (JP) ................................. 2023-058161

(51) Int. Cl.
*G01N 33/00*        (2006.01)
*G01M 15/10*        (2006.01)
*G01N 21/65*        (2006.01)
(52) U.S. Cl.
CPC .......... *G01M 15/102* (2013.01); *G01N 21/65* (2013.01)
(58) Field of Classification Search
CPC . G01M 15/102; G01N 21/65; G01N 27/4075; G01N 27/4077; G01N 33/0037; G01N 27/4071; G01N 27/409; G01N 27/411; G01N 33/0036
USPC .......... 73/23.31, 23.32, 31.05; 204/431, 432, 204/228.3, 229.7–230.1; 422/83, 94, 98
See application file for complete search history.

(56) References Cited

U.S. PATENT DOCUMENTS 6,258,233 B1 * 7/2001 Sugiyama .......... G01N 27/4073
                                          501/134
2020/0049679 A1    2/2020 Nakayama et al.

FOREIGN PATENT DOCUMENTS

| JP  | 2004156929 A   | * | 6/2004  | ............. C04B 35/111 |
| WO  | WO-2019087734 A1 | * | 5/2019  | ............. C04B 35/64 |
| WO  | 2019/155865 A1 |   | 8/2019  | |
| WO  | WO-2022254989 A1 | * | 12/2022 | ........... G01N 27/407 |

OTHER PUBLICATIONS

U.S. Appl. No. 18/604,653, filed Mar. 14, 2024.

* cited by examiner

*Primary Examiner* — Robert R Raevis
(74) *Attorney, Agent, or Firm* — MATTINGLY & MALUR, PC

(57)        ABSTRACT

A sensor element includes: an element body having a front end and a back end which are both ends in a longitudinal direction, a lateral face which is a face along the longitudinal direction, an outer lead section disposed on the lateral face; and a dense layer which covers part of the lateral face. The outer lead section has a first region which is covered at least in part by the dense layer. The first region contains zirconia. TM ratio is lower than 2, the TM ratio being a ratio Ht/Hm of a peak height Ht of T-phase to a peak height Hm of M-phase of zirconia in a Raman spectrum measured using Raman spectroscopy, and the dense layer has a thickness less than 11 μm.

14 Claims, 6 Drawing Sheets

SENSOR ELEMENT AND GAS SENSOR

CROSS-REFERENCE TO RELATED APPLICATION

The present application claims priority from Japanese application JP2023-058161, filed on Mar. 31, 2023, the content of which is hereby incorporated by reference into this application.

BACKGROUND OF THE INVENTION

1. Field of the Invention

The present invention relates to a sensor element and a gas sensor.

2. Description of the Related Art

Hitherto, a sensor element that detects the concentration of a specific gas, such as NOx, in a measurement-object gas, such as the exhaust gas of an automobile, is known (see, for example, PTL 1). The sensor element of PTL 1 includes an element body, an outer electrode, a connector electrode, an outer lead section, a porous layer, and a dense layer. A front-end side of the element body is exposed to a measurement-object gas. The outer electrode is disposed on the front-end side of a lateral face of the element body. The connector electrode is disposed on a back-end side of the lateral face of the element body to be electrically connected to a contact portion of a connector. The outer lead section is disposed on the lateral face of the element body to electrically connect the outer electrode and the connector electrode. The porous layer is disposed on the lateral face of the element body, and covers and protects at least part of the outer lead section. The dense layer is disposed on the lateral face of the element body, and located on the front-end side with respect to the connector electrode so that the porous layer is divided along the longitudinal direction of the element body, or is located on the back-end side with respect to the porous layer. When the water content in the measurement-object gas moves in the porous layer toward the back-end side of the element body due to capillary action, the water is prevented from reaching the connector electrode due to the presence of the dense layer because the capillary action is unlikely to occur in the dense layer.

CITATION LIST

Patent Literature

PTL 1: International Publication No. 2019/155865

SUMMARY OF THE INVENTION

In a sensor element in which at least part of an outer lead section is covered by a dense layer as in PTL 1, crack may occur in the sensor element.

The present invention has been devised to solve such a problem, and it is a main object to prevent crack of the sensor element.

The present invention employs the following device to achieve the above-described object.

[1] A sensor element of the present invention is a sensor element for detecting a specific gas concentration in a measurement-object gas, the sensor element including: an element body having a front end and a back end which are both ends along a longitudinal direction, and a lateral face which is a surface along the longitudinal direction, wherein a front-end side is to be exposed to the measurement-object gas; an outer electrode disposed on the front-end side of the lateral face; a connector electrode disposed on a back-end side of the lateral face to be electrically connected to an outside; an outer lead section disposed on the lateral face to electrically connect the outer electrode and the connector electrode; and a dense layer disposed closer to the front-end side than the connector electrode to cover part of the lateral face. The outer lead section has a first region which is covered at least in part by the dense layer, the first region contains zirconia, and TM ratio is lower than 2, the TM ratio being a ratio Ht/Hm of a peak height Ht of T-phase to a peak height Hm of M-phase of zirconia in a Raman spectrum measured using Raman spectroscopy, and the dense layer has a thickness less than 11 μm.

In the sensor element, the outer lead section has the first region which is covered at least in part by the dense layer. The first region contains zirconia, and the TM ratio of the zirconia is lower than 2. The dense layer has a thickness less than 11 μm. Because of these, the occurrence of crack of the sensor element can be prevented. The inventors confirmed this by experiments and analysis. Note that the value of TM ratio of zirconia in the first region is the value in an unused state of the sensor element.

[2] In the sensor element described above (the sensor element according to [1] stated above), the first region may have the TM ratio lower than or equal to 1. In this configuration, the effect of preventing the occurrence of crack of the sensor element is more reliably obtained.

[3] In the sensor element described above (the sensor element according to [1] or [2] stated above), the first region may have the TM ratio lower than or equal to 0.1. In this configuration, the occurrence of crack of the sensor element can be further prevented.

[4] In the sensor element described above (the sensor element according to any one of [1] to [3] stated above), the first region may have the TM ratio higher than or equal to 0.01.

[5] In the sensor element described above (the sensor element according to any one of [1] to [4] stated above), the dense layer may have a thickness less than or equal to 10 μm. In this configuration, the effect of preventing the occurrence of crack of the sensor element is more reliably obtained.

[6] In the sensor element described above (the sensor element according to any one of [1] to [5] stated above), the outer lead section may have the first region and a second region, and the dense layer may cover only the first region between the first region and the second region over a length from the front-end side to the back-end side of the dense layer. In this configuration, when the second region is present, the effect of preventing the occurrence of crack of the sensor element is more reliably obtained by the first region. Even when the TM ratio of the second region is not lower than 2, the effect of preventing the occurrence of crack of the sensor element is obtained, thus the degree of freedom in designing the second region is increased.

[7] The gas sensor of the present invention includes the sensor element according to any one of [1] to [6] stated above. Thus, with the gas sensor, the same effect as that of the above-described sensor element, for example, the effect of preventing the occurrence of crack of the sensor element is obtained.

DETAILED DESCRIPTION OF THE INVENTION

Figure 1:
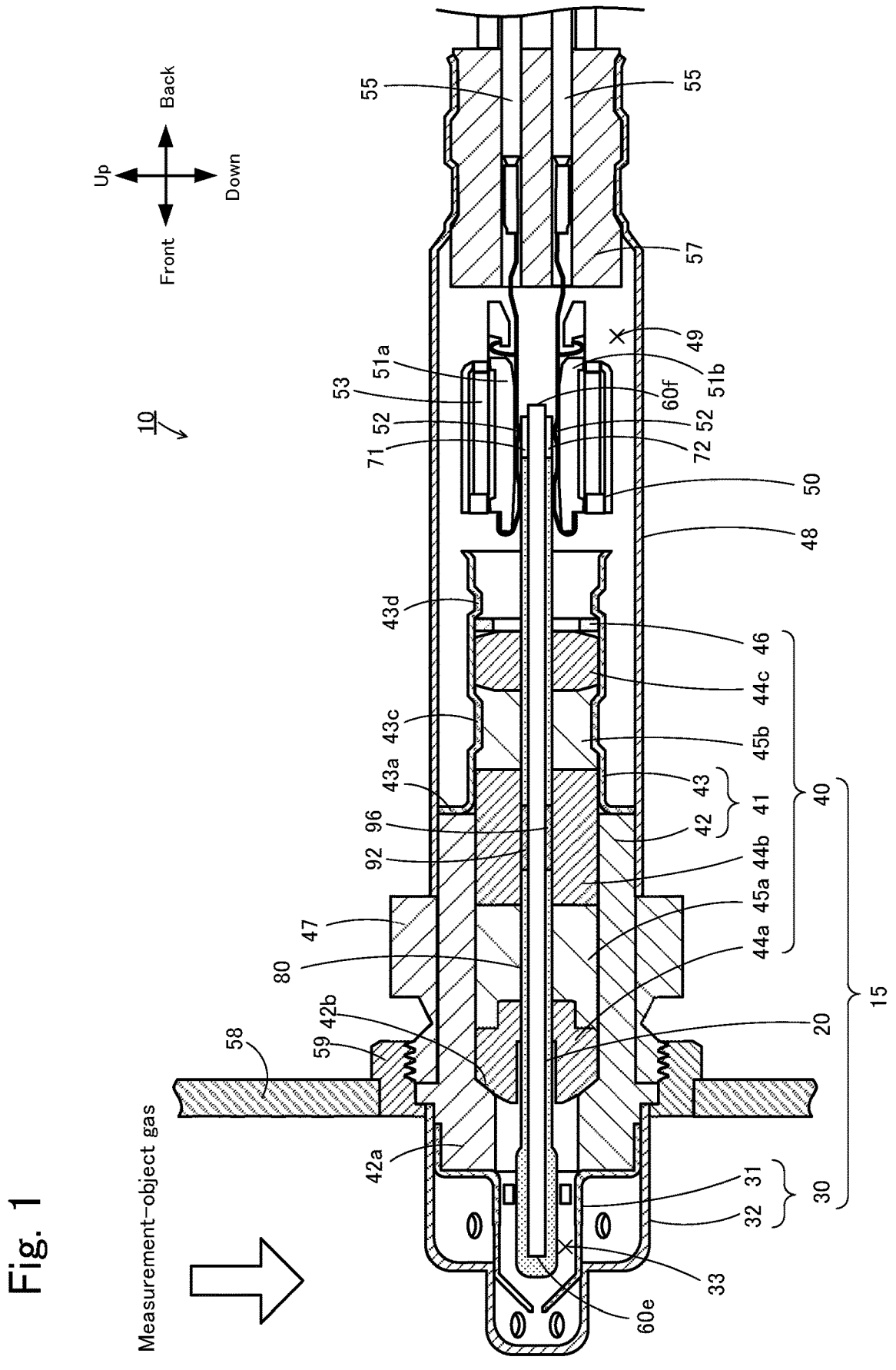
FIG. 1 is a vertical cross-sectional view illustrating the manner in which a gas sensor 10 is attached to a pipe 58.
Figure 2:
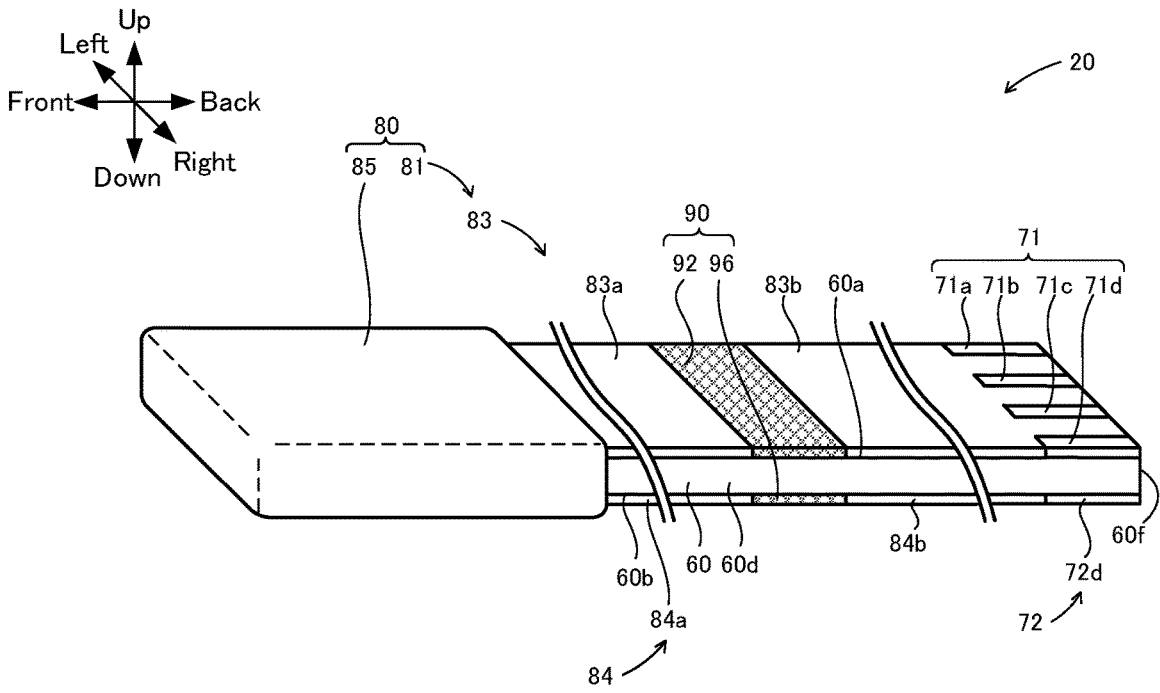
FIG. 2 is a perspective view of a sensor element 20.
Figure 3:
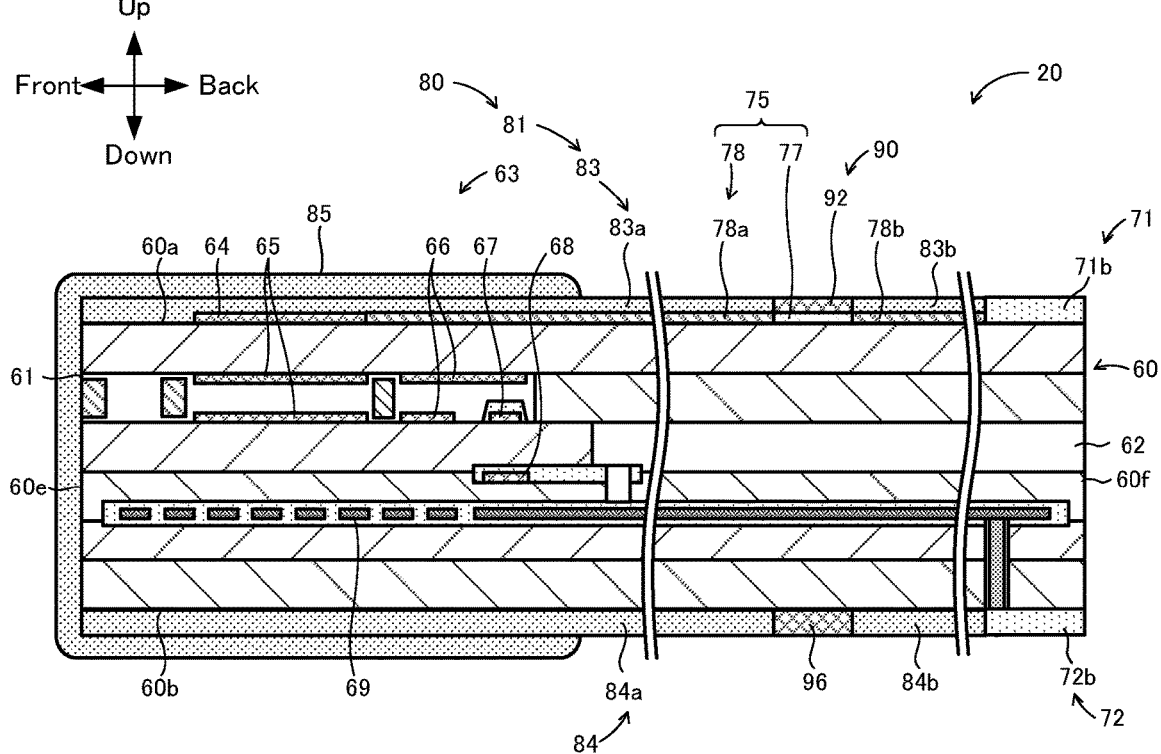
FIG. 3 is a vertical cross-sectional view of the sensor element 20.
Figure 4:
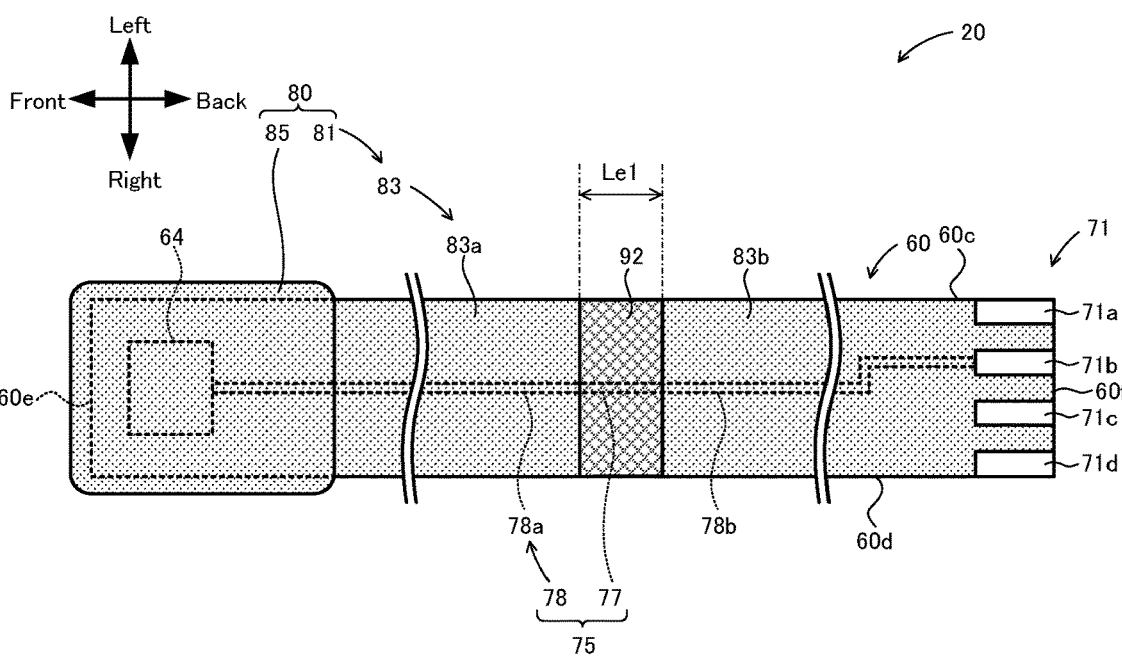
FIG. 4 is a top view of the sensor element 20.
Figure 5:
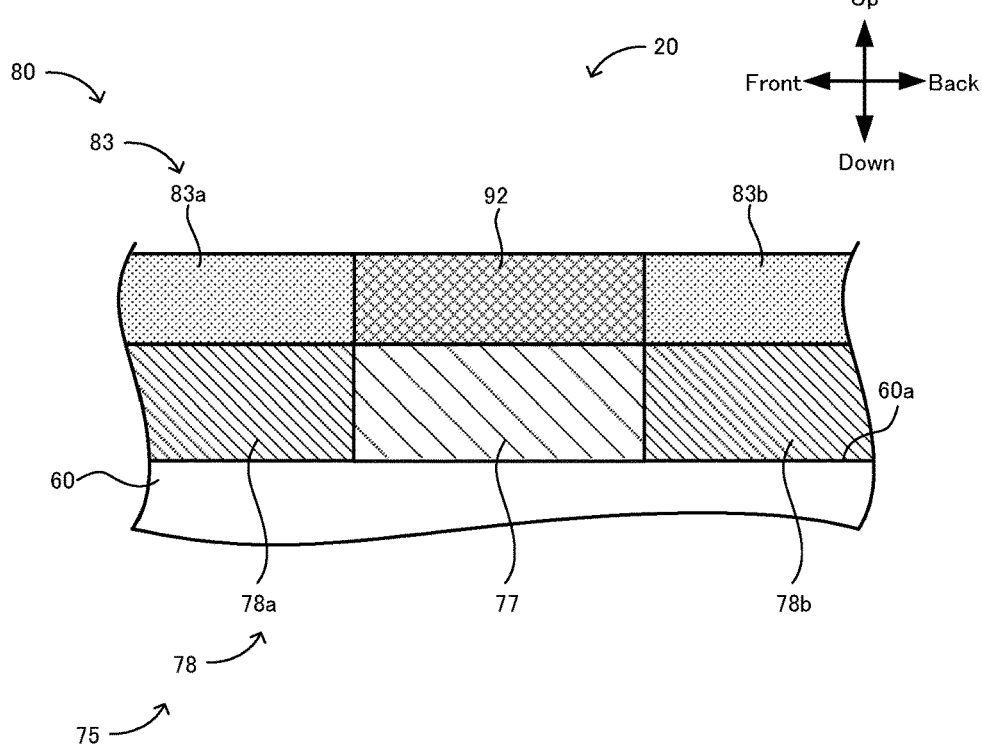
FIG. 5 is a vertical cross-sectional view illustrating the periphery of a first region 77 covered by a first dense layer 92.

Next, an embodiment of the present invention will be described using the drawings. FIG. 1 is a vertical cross-sectional view illustrating the manner in which a gas sensor 10 as an embodiment of the present invention is attached to a pipe 58. FIG. 2 is a perspective view of a sensor element 20 seen from the front upper right. FIG. 3 is a vertical cross-sectional view schematically illustrating a vertical cross-section of the sensor element 20. FIG. 4 is a top view of the sensor element 20. FIG. 5 is a vertical cross-sectional view illustrating the periphery of a first region 77 of an outer lead 75 covered by a first dense layer 92. In the present embodiment, as illustrated in FIG. 1 to FIG. 5, it is assumed that the longitudinal direction of an element body 60 of the sensor element 20 is the front-back direction (length direction), the stacking direction (thickness direction) of the solid electrolyte layer of the element body 60 is the up-down direction, and the direction perpendicular to the front-back direction and the up-down direction is the left-right direction (width direction).

As shown in FIG. 1, the gas sensor 10 includes an assembly 15, a nut 47, an external cylinder 48, a connector 50, lead wires 55, and a rubber stopper 57. The assembly 15 includes the sensor element 20, a protective cover 30, and an element-sealing member 40. The gas sensor 10 is attached to the pipe 58 such as an exhaust gas pipe of a vehicle and used to measure the concentration of a specific gas (a specific gas concentration) such as NOx or $O_2$ contained in the exhaust gas used as a measurement-object gas. In the present embodiment, the gas sensor 10 measures the concentration of NOx as the specific gas concentration. The sensor element 20 has opposite ends (front and back ends) along the longitudinal direction, and the front-end side is the side exposed to the measurement-object gas.

As illustrated in FIG. 1, the protective cover 30 includes a bottomed cylindrical inner protective cover 31 that covers the front-end side of the sensor element 20, and a bottomed cylindrical outer protective cover 32 that covers the inner protective cover 31. A plurality of holes to allow a measurement-object gas to flow therethrough are formed in each of the inner protective cover 31 and the outer protective cover 32. An element chamber 33 is formed as the space surrounded by the inner protective cover 31, and a fifth face 60e (front-end face) of the sensor element 20 is disposed in the element chamber 33.

The element-sealing member 40 is a member for sealing and fixing the sensor element 20. The element-sealing member 40 includes: a cylindrical body 41 including a metal fitting 42 and an inner cylinder 43; insulators 44a to 44c (examples of the dense body); compacts 45a and 45b; and a metal ring 46. The sensor element 20 is disposed so as to extend along the center axis of the element-sealing member 40 (an axis extending in the front-back direction in the present embodiment) and pierces through the element-sealing member 40 in the axial direction.

The metal fitting 42 is a cylindrical metallic member. The metal fitting 42 has a thick-walled portion 42a located on the front side and having an inner diameter smaller than that of the back side. The protective cover 30 is attached to a portion of the metal fitting 42 that is on the same side as the front end of the sensor element 20 (i.e., the front side). The back end of the metal fitting 42 is welded to a flange portion 43a of the inner cylinder 43. A part of the inner circumferential surface of the thick-walled portion 42a is formed as a bottom surface 42b that is a step surface. The bottom surface 42b bears the insulator 44a such that the insulator 44a does not protrude forward. The metal fitting 42 has a through hole that passes through the metal fitting 42 in the axial direction (the front-back direction in the present embodiment), and the sensor element 20 passes through the through hole.

The inner cylinder 43 is a cylindrical metallic member and has the flange portion 43a at its front end. The inner cylinder 43 and the metal fitting 42 are welded to each other so as to be coaxial with each other. The inner cylinder 43 has a reduced diameter portion 43c for pressing the compact 45b in a direction toward the center axis of the inner cylinder 43 and a reduced diameter portion 43d for pressing the insulators 44a to 44c and the compacts 45a and 45b in the front direction through the metal ring 46. The inner cylinder 43 has a through hole that passes through the inner cylinder 43 in the axial direction (the front-back direction in the present embodiment), and the sensor element 20 passes through the through hole. The through hole of the metal fitting 42 and the through hole of the inner cylinder 43 are in communication with each other in the axial direction and form the through hole of the cylindrical body 41.

The insulators 44a to 44c and the compacts 45a and 45b are disposed between the inner circumferential surface of the through hole of the cylindrical body 41 and the sensor element 20. The insulators 44a to 44c serve as supporters for the compacts 45a and 45b. Examples of the material of the insulators 44a to 44c include ceramics such as alumina, steatite, zirconia, spinel, cordierite, and mullite and glass. The insulators 44a to 44c are dense members, and their porosity is, for example, less than 1%. Each of the insulators 44a to 44c is a hollow columnar member having a through hole that passes therethrough in the axial direction (the front-back direction in the present embodiment), and the sensor element 20 passes through the through hole. In the present embodiment, the through hole of each of the insulators 44a to 44c has a quadrilateral cross-section that is perpendicular to the axial direction and conforms to the shape of the sensor element 20. The compacts 45a and 45b are formed, for example, by molding a powder and each serve as a sealing medium. Examples of the material of the compacts 45a and 45b include talc and ceramic powders such as alumina powder and boron nitride powder, and the compacts 45a and 45b may each contain at least one of these materials. Particles included in the compacts 45a and 45b may have an average particle diameter of 150 to 300 μm. The compact 45a is filled between the insulators 44a and 44b, sandwiched therebetween from opposite sides (front and back sides) in the axial direction, and pressed by the insulators 44a and 44b. The compact 45b is filled between the insulators 44b and 44c, sandwiched therebetween from opposite sides (front and back sides) in the axial direction, and pressed by the insulators 44b and 44c. The insulators 44a to 44c and the compacts 45a and 45b are sandwiched between the bottom surface 42b of the thick-walled portion 42a of the metal fitting 42 and both the reduced diameter portion 43d and the metal ring 46 and pressed in the axial direction from opposite sides (the front and back sides). The pressing force applied by the reduced diameter portions 43c and 43d causes the compacts 45a and 45b to be compressed between the cylindrical body 41 and the sensor element 20, and the compacts 45a and 45b close the communication between the element chamber 33 in the protective cover 30 and a space 49 in the external cylinder 48 and fix the sensor element 20.

The nut 47 is fixed to the outer side of the metal fitting 42 so as to be coaxial with the metal fitting 42. The nut 47 has a male thread portion formed on the outer circumferential surface of the nut 47. The male thread portion is screwed into a female thread portion formed on the inner circumferential surface of a fixing member 59 welded to the pipe 58. In this manner, the gas sensor 10 is fixed to the pipe 58 with the front-end side of the sensor element 20 and the protective cover 30 protruding into the pipe 58.

The external cylinder 48 is a cylindrical body made of metal, and covers the inner cylinder 43, the back-end side of the sensor element 20, and the connector 50. The back end of the main metal fitting 42 is inserted inside the external cylinder 48. The front end of the external cylinder 48 is welded to the main metal fitting 42. A plurality of leads 55 connected to the connector 50 are drawn to the outside from the back end of the external cylinder 48. The connector 50 has housings 51a, 51b, a plurality of contact metal fittings 52, and clamps 53. The housings 51a, 51b are members made of ceramics, such as alumina, and disposed at upper and lower positions of the back end of the sensor element 20. The multiple contact metal fittings 52 are each a member made of metal, and disposed on the lower side of the housing 51a and on the upper side of the housing 51b. The clamps 53 are members obtained by bending plate-shaped metal into C-character shape, and vertically hold the housings 51a, 51b with an elastic force to press them in a direction in which they approach each other. The elastic force from the clamps 53 causes the housings 51a, 51b to hold and fix the back end of the sensor element 20 via a plurality of contact metal fittings 52. The plurality of contact metal fittings 52 are each in contact with and electrically connected to corresponding one of a plurality of upper connector electrodes 71 and a plurality of lower connector electrodes 72 disposed on the surface of the back-end side of the sensor element 20, and electrically connected to corresponding one of a plurality of leads 55. The plurality of leads 55 are each electrically connected to one of a plurality of electrodes 64 to 68 inside the sensor element 20 and a heater 69 via one of the connector 50, and the plurality of upper connector electrodes 71 and the plurality of lower connector electrodes 72. The gap between the external cylinder 48 and the leads 55 are sealed by the rubber stopper 57. The space 49 in the external cylinder 48 is filled with a reference gas. A sixth face 60f (back-end face) of the sensor element 20 is disposed in the space 49.

As illustrated in FIG. 2 to FIG. 4, the sensor element 20 includes the element body 60, a detector 63, the heater 69, the plurality of upper connector electrodes 71, the plurality of lower connector electrodes 72, a porous layer 80, and a dense layer 90. The element body 60 has a layered body obtained by stacking multiple (six in FIG. 3) oxygen-ion-conductive solid electrolyte layers such as zirconia (ZrO2) layers. The element body 60 has a rectangular parallelepiped shape with the longitudinal direction in the front-back direction, and has first to sixth faces 60a to 60f as the outer surfaces on the up, down, left, right, front, and back. The first to fourth faces 60a to 60d are the surfaces along the longitudinal direction of the element body 60, and correspond to the lateral faces of the element body 60. The fifth face 60e is the front-end face of the element body 60, and the sixth face 60f is the back-end face of the element body 60. The dimensions of the element body 60 may be, for example, such that the length in the front-back direction is 25 mm or more and 100 mm or less, the width in the left-right direction is 2 mm or more and 10 mm or less, and the thickness in the up-down direction is 0.5 mm or more and 5 mm or less. In the element body 60, a measurement-object gas inlet 61 and a reference gas inlet 62 are formed, the measurement-object gas inlet 61 being open in the fifth face 60e to allow a measurement-object gas to be introduced to the inside of the element body 60, the reference gas inlet 62 being open in the sixth face 60f to allow a reference gas (here, the atmosphere) which serves as a reference for detection of a specific gas concentration to be introduced to the inside of the element body 60.

The detector 63 is used to detect the specific gas concentration in the measurement-object gas. The detector 63 includes a plurality of electrodes disposed on a front-end side of the element body 60. In the present embodiment, the detector 63 includes an outer electrode 64 disposed on the first face 60a and further includes an inner main pump electrode 65, an inner auxiliary pump electrode 66, a measurement electrode 67, and a reference electrode 68 that are disposed inside the element body 60. The inner main pump electrode 65 and the inner auxiliary pump electrode 66 are disposed on the inner circumferential surface of an internal space of the element body 60 and each have a tunnel-like structure.

The principle of the detection of the specific gas concentration in the measurement-object gas by the detector 63 is well known, and its detailed description will be omitted. The detector 63 detects the specific gas concentration, for example, in the following manner. The detector 63 pumps oxygen in the measurement-object gas around the inner main pump electrode 65 to the outside (the element chamber 33) or pumps oxygen from the outside according to a voltage applied between the outer electrode 64 and the inner main pump electrode 65. Moreover, the detector 63 pumps oxygen in the measurement-object gas around the inner auxiliary pump electrode 66 to the outside (the element chamber 33) or pumps oxygen from the outside according to a voltage applied between the outer electrode 64 and the inner auxiliary pump electrode 66. This allows the measurement-object gas whose oxygen concentration has been adjusted to a prescribed concentration to reach the measurement electrode 67. The measurement electrode 67 functions as a NOx reduction catalyst and reduces the specific gas (NOx) in the measurement-object gas that has reached the measurement electrode 67. Then the detector 63 generates an electric signal corresponding to an electromotive force generated between the measurement electrode 67 and the reference electrode 68 according to the oxygen concentration in the reduced gas or corresponding to a current flowing between the measurement electrode 67 and the outer electrode 64 according to the electromotive force. The electric signal generated by the detector 63 is a signal indicating a value corresponding to the specific gas concentration in the measurement-object gas (a value from which the specific gas concentration can be derived) and corresponds to the detection value detected by the detector 63.

The heater 69 is an electric resistor disposed inside the element body 60. When electric power is supplied to the heater 69 from the outside, the heater 69 generates heat and heats the element body 60. The heater 69 can heat the solid electrolyte layers included in the element body 60, can keep them hot, and can adjust their temperature to the temperature at which the solid electrolyte layers are activated (e.g., 800° C.).

The plurality of upper connector electrodes 71 and the plurality of lower connector electrodes 72 are each disposed on the back-end side of one of the lateral faces of the element body 60, and serves as an electrode to be electrically connected to the outside. The plurality of upper connector electrodes 71 and the plurality of lower connector electrodes 72 are exposed without being covered by the porous layer 80. In the present embodiment, four upper connector electrodes 71 (71a to 71d in FIG. 4) are arranged in the left-right direction, and disposed on the back-end side of the first face 60a (the upper face). Four lower connector electrodes 72 are arranged in the left-right direction, and disposed on the back-end side of the second face 60b (the lower face) opposed to the first face 60a (the upper face). The four upper connector electrodes 71 (71a to 71d) and the four lower connector electrodes 72 are each electrically connected to one of the plurality of electrodes 64 to 68 of the detector 63 and the heater 69. In the present embodiment, the upper connector electrode 71a is conductive to the measurement electrode 67, the upper connector electrode 71b is conductive to the outer electrode 64, the upper connector electrode 71c is conductive to the inner auxiliary pump electrode 66, the upper connector electrode 71d is conductive to the inner main pump electrode 65, three lower connector electrodes 72 are each conductive to the heater 69, and one lower connector electrode 72 is conductive to the reference electrode 68. The upper connector electrode 71b and the outer electrode 64 are conductive via the outer lead 75 disposed in the first face 60a (see FIG. 3 and FIG. 4). Other connector electrodes are each conductive to a corresponding electrode or the heater 69 via a lead or a through-hole disposed inside the element body 60.

The outer lead 75 is a conductor containing, for example, noble metal such as platinum (Pt) or high melting point metal such as tungsten (W), molybdenum (Mo); and zirconia. Zirconia is the same material as the oxygen-ion-conductive solid electrolyte contained in the element body 60. The outer lead 75 is preferably a cermet conductor containing noble metal or high melting point metal, and zirconia. In the present embodiment, the outer lead 75 is assumed to be a cermet conductor containing platinum and zirconia. As illustrated in FIG. 3, FIG. 4, and FIG. 5, the outer lead 75 has a first region 77 and a second region 78. In the present embodiment, the outer lead 75 is configured such that the portion other than the first region 77 is all the second region 78. The second region 78 is covered by the porous layer 80, and more specifically, as illustrated in FIG. 3, is covered by a first inner porous layer 83. The second region 78 has a front-end side portion 78a disposed forward of the first region 77 to be in contact with the first region 77 in the front-back direction, and a back-end side portion 78b disposed backward of the first region 77 to be in contact with the first region 77 in the front-back direction. The front-end side portion 78a of the second region 78 is covered by a front-end side portion 83a of the first inner porous layer 83 of the porous layer 80, and the back-end side portion 78b is covered by a back-end side portion 83b of the first inner porous layer 83. The first region 77 is covered at least in part by the dense layer 90, and more specifically, as illustrated in FIG. 3, is covered by the first dense layer 92. In the present embodiment, as illustrated in FIG. 3 and FIG. 5, the first dense layer 92 and the first region 77 have the same length in the front-back direction, and both front-end positions and both back-end positions are the same. Thus, the first region 77 does not have a protruding portion which protrudes from the first dense layer 92 to the front-end side and/or the back-end side.

In the first region 77, TM ratio is lower than 2, the TM ratio being a ratio Ht/Hm of peak height Ht of T-phase (tetragonal crystal) to peak height Hm of M-phase (monoclinic crystal) of zirconia in a Raman spectrum measured using Raman spectroscopy. The TM ratio of zirconia in the first region 77 is preferably lower than or equal to 1, and more preferably lower than or equal to 0.1. The TM ratio of zirconia in the first region 77 may be higher than or equal to 0.01. In the second region 78, the TM ratio of zirconia may be the same as or different from that of the first region 77. The TM ratio of the second region 78 may be higher than or lower than the TM ratio of the first region 77. The first region 77 and the second region 78 may be made of different materials from each other, for example, while the first region 77 contains zirconia, the second region 78 may not contain zirconia. In the present embodiment, the first region 77 and the second region 78 are formed of the same material with different TM ratios of zirconia.

Figure 6:
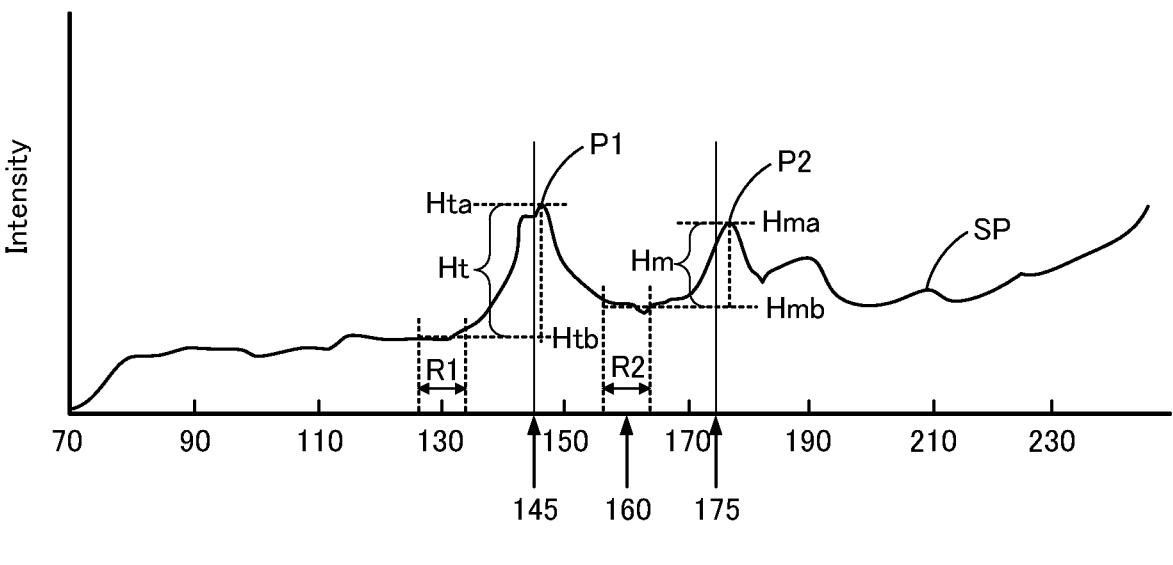
FIG. 6 is an explanatory graph schematically illustrating the manner in which peak height Ht and peak height Hm are calculated from Raman spectrum SP.

The TM ratio of zirconia in the first region 77 of the outer lead 75 is the value derived as follows using a Raman spectrum measured with Raman spectroscopy. First, the sensor element 20 is cut in the thickness direction of the outer lead 75 so that the cross section of the first region 77 of the outer lead 75 serves as an observation surface, and the cut surface is processed by an ion milling method to produce a cross-sectional sample. Subsequently, the observation surface is irradiated with a laser beam using e.g., a Raman spectrometer to obtain a Raman spectrum. The Raman spectrum is obtained between 70 and 800 cm$^{-1}$, and a maximum value, and a minimum value of intensity in this range are calculated. Furthermore, the minimum value is subtracted from the overall intensity, and spectrum is normalized with the value of (the maximum value–the minimum value). FIG. 6 is an explanatory graph schematically illustrating the manner in which peak height Ht and peak height Hm are calculated from the Raman spectrum SP which is an example of Raman spectrum obtained in the above-mentioned manner. The horizontal axis of FIG. 6 indicates Raman shift [cm$^{-1}$], and the vertical axis indicates the intensity of the normalized Raman spectrum. For example, when the Raman spectrum SP as illustrated in FIG. 6 is obtained, first, peak P1, at which the Raman shift is at the position closest to 145 cm$^{-1}$, is identified as a peak derived from the T-phase based on the Raman spectrum SP. The intensity Hta of the peak P1 is then calculated based on the Raman spectrum SP. Subsequently, the intensity Htb of the baseline of the peak P1 is calculated. The intensity Htb is calculated as the average value of intensity in region R1 (the region of 129 cm$^{-1}$ or greater and 131 cm$^{-1}$ or less) where the Raman shift is near 130 cm$^{-1}$ in the Raman spectrum SP. Then the difference between the intensity Hta and the intensity Htb is calculated as the peak height Ht of the T-phase. Also, peak P2, at which the Raman shift is at the position closest to 175 cm$^{-1}$, is identified as a peak derived from the M-phase based on the Raman spectrum SP. The intensity Hma of the peak P2 is then calculated based on the Raman spectrum SP. Subsequently, the intensity Hmb of the baseline of the peak P2 is calculated. The intensity Hmb is calculated as the average value of intensity in region R2 (the region of 159 cm$^{-1}$ or greater and 161 cm$^{-1}$ or less) where the Raman shift is near 160 cm$^{-1}$ in the Raman spectrum SP. Then the difference between the intensity Hma and the intensity Hmb is calculated as the peak height Hm of the M-phase. TM ratio=Ht/Hm is calculated based on thus calculated peak height Ht of the T-phase and peak height Hm of the M-phase. The TM ratio of zirconia in the second region 78 is also the value derived in the same manner. Note that the regions R1, R2 are determined in advance from regions which do not interfere with each of the peak derived from the T-phase and the peak derived from the M-phase (regions which overlap with none of the peaks).

The porosities of the first region 77 and the second region 78 may each be greater than or equal to 5%. The porosities of the first region 77 and the second region 78 may each be less than or equal to 40%, or less than 15%. The first region 77 and the second region 78 may have different porosities. The front-end side portion 78a and the back-end side portion 78b of the second region 78 may have different porosities. The line width (width) of the outer lead 75 may be e.g., 0.1 mm or greater and 1.0 mm or less. The line thickness (thickness) of the outer lead 75 may be e.g., 1 μm or greater and 30 μm or less. An insulating layer which is not illustrated, for insulating the outer lead 75 from the solid electrolyte layer of the element body 60 may be disposed between the outer lead 75 and the first face 60a of the element body 60.

The porosities of the first region 77 and the second region 78 of the outer lead 75 are the values derived as follows using an image (SEM image) obtained through observation using a scanning electron microscope (SEM). First, the sensor element 20 is cut in the thickness direction of the outer lead 75 so that the cross section of the outer lead 75 serves as an observation surface, and the cut surface is embedded in a resin and polished to produce a sample for observation. Subsequently, the magnification of the SEM is set in a range from 1000 times to 10000 times, and a SEM image of the outer lead 75 is obtained by capturing the observation surface of the sample for observation. Next, image analysis is performed on the obtained image, and from the brightness distribution of brightness data of the pixels in the image, a threshold is determined by a discriminant analysis method (Otsu's binarization). Subsequently, each pixel in the image is binarized to an object portion and a pore portion based on the determined threshold to calculate the area of the object portion and the area of the pore portion. The ratio of the area of the pore portion to the entire area (the total area of the object portion and the pore portion) is derived as the porosity (unit is %). The porosities of the later-described porous layer 80 and dense layer 90 are also the values derived in the same manner.

The porous layer 80 is a porous body that covers part of the lateral faces of the element body 60, on which the upper, lower connector electrodes 71, 72 are disposed, that is, part of the first, second faces 60a, 60b. In the present embodiment, the porous layer 80 covers at least the front-end side of the first, second faces 60a, 60b. The porous layer 80 includes an inner porous layer 81, and an outer porous layer 85 that cover the first, second faces 60a, 60b, respectively, the outer porous layer 85 being disposed outside the inner porous layer 81.

The inner porous layer 81 includes the first inner porous layer 83 that covers the first face 60a, and a second inner porous layer 84 that covers the second face 60b. The first inner porous layer 83 has the front-end side portion 83a and the back-end side portion 83b (see FIG. 2 to FIG. 4, FIG. 5). The front-end side portion 83a covers the region from the front end of the first face 60a to the front end of the first dense layer 92 on the first face 60a. The back-end side portion 83b covers the region from the back end of the first dense layer 92 to the back end of the first face 60a on the first face 60a, the region excluding the area where the upper connector electrodes 71 are present. The right and left width of the front-end side portion 83a and the back-end side portion 83b of the first inner porous layer 83 is the same as the right and left width of the first face 60a, and the front-end side portion 83a and the back-end side portion 83b cover the first face 60a over a length from the left end to the right end of the first face 60a. The first inner porous layer 83 covers at least part of each of the outer electrode 64 and the outer lead 75. In the present embodiment, as illustrated in FIG. 3 and FIG. 4, the first inner porous layer 83 covers all the outer electrode 64, and covers the portion (in other words, all the second region 78) of the outer lead 75, excluding the first region 77. The first inner porous layer 83 protects the outer electrode 64 and the outer lead 75 against e.g., the components, such as sulfuric acid, in the measurement-object gas to play a role as a protective layer to prevent corrosion of these.

The second inner porous layer 84 has a front-end side portion 84a and a back-end side portion 84b (see FIG. 2, FIG. 3). The front-end side portion 84a covers the region from the front end of the second face 60b to the front end of the second dense layer 96 on the second face 60b. The back-end side portion 84b covers the region from the back end of the second dense layer 96 to the back end of the second face 60b on the second face 60b, the region excluding the area where the lower connector electrodes 72 are present. The right and left width of the front-end side portion 84a and the back-end side portion 84b of the second inner porous layer 84 is the same as the right and left width of the second face 60b, and the front-end side portion 84a and the back-end side portion 84b cover the second face 60b over a length from the left end to the right end of the second face 60b.

The outer porous layer 85 covers at least part of each of the first to fifth faces 60a to 60e. For the first face 60a and the second face 60b, the outer porous layer 85 covers the inner porous layer 81, thereby covering these faces. The outer porous layer 85 has a shorter length in the front-back direction than the inner porous layer 81, and unlike the inner porous layer 81, covers only the front end of the element body 60 and the region in the vicinity of the front end. Thus, the outer porous layer 85 covers the peripheral portion of a plurality of electrodes 64 to 68 of the detector 63 of the element body 60, in other words, a portion disposed in the element chamber 33 of the element body 60, the portion to be exposed to the measurement-object gas. Thus, the outer porous layer 85 plays a role as a protective layer to prevent the occurrence of crack of the element body 60 due to, for example, adherence of water in the measurement-object gas to the element body 60.

The porous layer 80 is formed of a ceramic porous body such as an alumina porous body, a zirconia porous body, a spinel porous body, a cordierite porous body, a titania porous body, and a magnesia porous body. In the present embodiment, the porous layer 80 is assumed to be formed of an alumina porous body. The thickness of each of the first inner porous layer 83 and the second inner porous layer 84 may be e.g., 5 μm or greater and 40 μm or less. The thickness of the outer porous layer 85 may be e.g., 40 μm or greater and 800 μm of less. The porosity of the porous layer 80 is greater than or equal to 10%. Although the porous layer 80 covers the outer electrode 64 and the measurement-object gas inlet 61, if the porosity of the porous layer 80 is greater than or equal to 10%, the measurement-object gas can pass through the porous layer 80. The porosity of the inner porous layer 81 may be 10% or greater and 50% or less. The porosity of the outer porous layer 85 may be 10% or greater and 85% or less. The outer porous layer 85 may have the same porosity as that of the inner porous layer 81, or may have a higher porosity than the inner porous layer 81.

The dense layer 90 inhibits the capillary action of water along the longitudinal direction of the element body 60. In the present embodiment, the dense layer 90 has the first dense layer 92 and the second dense layer 96. The first dense layer 92 is provided in the first face 60a in which the upper connector electrodes 71 and the first inner porous layer 83 are disposed. The first dense layer 92 is provided on the back-end side of the element body 60 with respect to at least part (here, the outer porous layer 85 and the front-end side portion 83a) of the porous layer 80, in other words, backward of the element body 60. The first dense layer 92 is provided on the front-end side of the element body 60 with respect to the plurality of upper connector electrodes 71, in other words, front of the plurality of upper connector electrodes 71. The first dense layer 92 is provided backward of the outer electrode 64. The first dense layer 92 is provided backward of any of the plurality of electrodes 64 to 68 of the detector 63 including the outer electrode 64 (see FIG. 3). When water moves backward within the first inner porous layer 83 due to capillary action, the first dense layer 92 prevents the water from passing therethrough, thereby playing a role of preventing the water from reaching the upper connector electrodes 71. The first dense layer 92 is a dense layer having a porosity less than 10%. The right and left width of the first dense layer 92 is the same as the right and left width of the first face 60a, and the first dense layer 92 covers the first face 60a over a length from the left end to the right end of the first face 60a. The front end of the first dense layer 92 is in contact with the back end of the front-end side portion 83a of the first inner porous layer 83. The back end of the first dense layer 92 is in contact with the front end of the back-end side portion 83b of the first inner porous layer 83. As illustrated in FIG. 3, FIG. 4 and FIG. 5, the first dense layer 92 covers the first region 77 of the outer lead 75.

The second dense layer 96 is provided in the second face 60b in which the plurality of lower connector electrodes 72 and the second inner porous layer 84 are disposed. The second dense layer 96 is provided on the back-end side of the element body 60, in other words, backward of the element body 60 with respect to at least part (here, the outer porous layer 85 and the front-end side portion 84a) of the porous layer 80. The second dense layer 96 is provided on the front-end side of the element body 60, in other words, front of the plurality of lower connector electrodes 72 with respect to the plurality of lower connector electrodes 72. The second dense layer 96 is provided backward of any of the plurality of electrodes 64 to 68 of the detector 63 including the outer electrode 64 (see FIG. 3). When water moves backward within the second inner porous layer 84 due to capillary action, the second dense layer 96 prevents the water from passing therethrough, thereby playing a role of preventing the water from reaching the lower connector electrodes 72. The second dense layer 96 is a dense layer having a porosity less than 10%. The right and left width of the second dense layer 96 is the same as the right and left width of the second face 60b, and the second dense layer 96 covers the second face 60b over a length from the left end to the right end of the second face 60b. The front end of the second dense layer 96 is in contact with the back end of the front-end side portion 84a of the second inner porous layer 84. The back end of the second dense layer 96 is in contact with the front end of the back-end side portion 84b of the second inner porous layer 84.

The first dense layer 92 and the second dense layer 96 are different from the porous layer 80 in that the porosities are less than 10%; however, it is possible to use ceramics made from materials illustrated for the above-described porous layer 80. In the present embodiment, the first dense layer 92 and the second dense layer 96 are each assumed to be ceramics of alumina. The thickness of the first dense layer 92 is less than 11 μm. The thickness of the first dense layer 92 may be less than or equal to 10 μm. The thickness of the first dense layer 92 may be greater than or equal to 5 μm. The thickness of the first dense layer 92 may be less than the thickness of the first inner porous layer 83. The thickness of the first dense layer 92 may be less than the thickness of the outer lead 75. The thickness of the first dense layer 92 is assumed to be the thickness measured at the portion located immediately above the outer lead 75 of the first dense layer 92. The porosity of each of the first dense layer 92 and the second dense layer 96 is preferably less than or equal to 8%, and more preferably less than or equal to 58. For a lower porosity, the first dense layer 92 and the second dense layer 96 can further inhibit capillary action of water along the longitudinal direction of the element body 60.

In the longitudinal direction (here, the front-back direction) of the element body 60, the length Le1 (see FIG. 4) of the first dense layer 92 may be greater than or equal to 0.5 mm. The length Le1 may be greater than or equal to 5 mm. The length Le1 may be less than or equal to 25 mm, and may be less than or equal to 20 mm. In the present embodiment, the length of the first region 77 of the outer lead 75 is equal to the length Le1 of the first dense layer 92.

The first dense layer 92 and the second dense layer 96 are each disposed to overlap with the inner peripheral surface of one of a plurality of insulators 44a to 44c in the position of the element body 60 along the longitudinal direction. In the present embodiment, as illustrated in FIG. 1, the first dense layer 92 and the second dense layer 96 are each disposed to overlap with the inner peripheral surface of the insulator 44b of the insulators 44a to 44c in the position of the sensor element 20 along the longitudinal direction. The inner peripheral surfaces of the insulator 44b are the surfaces thereof, opposed to the first dense layer 92 and the second dense layer 96, in other words, the surfaces exposed to the first dense layer 92 and the second dense layer 96, that is, the surfaces located on the upper side and the lower side of the inner peripheral surfaces of the cross-sectional rectangular shape of the insulator 44b.

Next, a method for producing the gas sensor 10 having the above-described structure will be described. A method for producing the sensor element 20 will be described, and then the method for producing the gas sensor 10 including the sensor element 20 installed therein will be described.

A method of manufacturing the sensor element 20 will be described. First, multiple (here, six) unfired ceramics green sheets corresponding to the element body 60 are prepared.

Each green sheet is provided with notches, through-holes and grooves by a punching process as needed, and wiring patterns such as electrodes and the outer lead 75 are screen printed. Also, unfired porous layers which become the first inner porous layer 83 and the second inner porous layer 84 after firing, and unfired dense layers which become the first dense layer 92 and the second dense layer 96 after firing are formed by screen printing on the faces of the green sheets corresponding to the first, second faces 60a, 60b. Subsequently, multiple green sheets are stacked. The stacked multiple green sheets provide an unfired element body which becomes the element body after firing, and include an unfired porous layer and an unfired dense layer. Then the unfired element body is fired to obtain the element body 60 including the first inner porous layer 83, the second inner porous layer 84, the first dense layer 92, and the second dense layer 96. Subsequently, the outer porous layer 85 is formed by plasma spraying to obtain the sensor element 20. Note that as a method of manufacturing the porous layer 80, the first dense layer 92, and the second dense layer 96, the gel cast method, and dipping can be used in addition to screen printing and plasma spraying.

A wire pattern which becomes the outer lead 75 after firing can be formed by screen printing using the slurry obtained by kneading, for example, material particles (here, platinum particles and zirconia particles) of the outer lead 75, an additive agent, and a solvent. As the additive agent, for example, yttrium oxide ($Y_2O_3$), calcium oxide (CaO), and magnesium oxide (MgO) may be mentioned. In the present embodiment, the additive agent is assumed to be yttrium oxide. A pore forming material may be contained in the slurry which becomes the wire pattern of the outer lead 75. The TM ratio of zirconia in the first region 77 of the outer lead 75 can be adjusted by adjusting, for example, the content ratio of the above-mentioned additive agent, and the firing temperature (in other words, the firing temperature of an unfired element body) of the wire pattern which becomes the outer lead 75. For example, the higher the content ratio of the additive agent, the higher the ratio of crystal of the T-phase than that of the M-phase of zirconia at room temperature after firing, and eventually, the TM ratio tends to increase. Thus, the TM ratio can be reduced by decreasing the content ratio of the additive agent. The TM ratio can be reduced, for example, by decreasing the ratio B/A of the content ratio B (mol %) of yttrium oxide to the content ratio A (mol %) of zirconia in the slurry to form a wire pattern which becomes the first region 77. The lower the firing temperature, the higher the ratio of crystal of the M-phase than that of the T-phase, and the TM ratio tends to decrease. Thus, the TM ratio can be reduced by setting the firing temperature to a relatively low temperature. The respective wire patterns of the first region 77 and the second region 78 of the outer lead 75 can be formed, for example, by preparing two types of slurries made from the same material except that the values of the above-mentioned ratio B/A are different, and by screen printing the two types of slurries separately. Note that when the additive agent is used as mentioned above, the first region 77 and the second region 78 after manufacturing also contain the additive agent (e.g., at least one of yttrium oxide, calcium oxide, or magnesium oxide). The thickness of the first dense layer 92 can be adjusted, for example, by changing the number of printing when an unfired dense layer which becomes the first dense layer 92 is formed, and adjusting the viscosity of the unfired dense layer.

A method of manufacturing the gas sensor 10 with the built-in sensor element 20 will be described. First, the sensor element 20 is caused to penetrate a through-hole of the cylindrical body 41 in an axial direction, and the insulator 44a, the compact 45a, the insulator 44b, the compact 45b, an insulator 44c, and the metal ring 46 are disposed in this order between the inner peripheral surface of the cylindrical body 41 and the sensor element 20. Next, the metal ring 46 is pressed to compress the compacts 45a, 45b, and in the state, the element-sealing member 40 is manufactured by forming the reduced diameter portions 43c, 43d, and the space between the inner peripheral surface of the cylindrical body 41 and the sensor element 20 is sealed. Subsequently, the protective cover 30 is welded to the element-sealing member 40, and the nut 47 is attached thereto to obtain the assembly 15. The lead 55 that is passed through the rubber stopper 57, and the connector 50 connected to the lead 55 are prepared. The prepared connector 50 is connected to the back-end side of the sensor element 20, and the plurality of contact metal fittings 52 of the connector 50 are each electrically connected to a corresponding connector electrode of the plurality of upper connector electrodes 71 and lower connector electrodes 72. Subsequently, the external cylinder 48 is welded and fixed to the main metal fitting 42 to obtain the gas sensor 10.

Next, an example of the use of the gas sensor 10 having the above-described structure will be described. When the measurement-object gas flows through the pipe 58 with the gas sensor 10 attached to the pipe 58 as shown in FIG. 1, the measurement-object gas flows through the protective cover 30 and into the element chamber 33, and the front-end side of the sensor element 20 is exposed to the measurement-object gas. Then the measurement-object gas passes through the porous layer 80, reaches the outer electrode 64, and also reaches the sensor element 20 through the measurement-object gas inlet 61, and the detector 63 generates an electrical signal corresponding to the NOx concentration in the measurement-object gas as described above. By outputting this electrical signal through the upper and lower connector electrodes 71 and 72, the NOx concentration is detected based on the electrical signal.

In the sensor element 20 of thus configured gas sensor 10, as described above, the outer lead 75 has the first region 77 covered by the first dense layer 92. The first region 77 contains zirconia, and the TM ratio of zirconia is lower than 2. The first dense layer 92 has a thickness less than 11 μm. Because of these, the occurrence of crack of the sensor element 20 can be prevented. The inventors confirmed this by experiments and analysis. The reason why such an effect is obtained is probably as follows. When the outer lead 75 contains zirconia, the volume of zirconia may expand due to TM transformation (change in the crystal structure from the T-phase (tetragonal crystal) to the M-phase (monoclinic crystal)) of zirconia caused by heat when the sensor element 20 is used. Therefore, when the portion of the outer lead 75, covered by the first dense layer 92 expands too much, the stress inside the first dense layer 92 increases, and there is a possibility that crack may occur in the sensor element 20, for example, crack may occur in the first dense layer 92. In contrast, in the sensor element 20 of the present embodiment, in the outer lead 75, the first region 77 covered by the first dense layer 92 has the TM ratio of zirconia lower than 2, thus as compared to when the TM ratio is higher than or equal to 2, the ratio of the T-phase of zirconia is low, and the ratio of the M-phase is high. Therefore, the zirconia in the first region 77 of the present embodiment has a low ratio of the T-phase that changes to the M-phase, thus the decrease rate of the TM ratio due to the TM transformation is reduced, and the expansion rate of the volume of the first region 77 due to the TM transformation is reduced. Since the thickness of the first dense layer 92 is less than 11 μm which is small, the Young's modulus of the first dense layer 92 is low, thus even when the first region 77 expands, the stress inside the first dense layer 92 is unlikely to increase. Because of these, the occurrence of crack of the sensor element 20 can be probably prevented.

The lower the TM ratio of the first region 77, the lower the decrease rate of the TM ratio due to the TM transformation, and the expansion rate of the volume of the first region 77 due to the TM transformation is reduced, thus the effect of preventing the occurrence of crack of the sensor element 20 is enhanced. From this point of view, the TM ratio of the first region 77 is preferably lower than or equal to 1, and more preferably, lower than or equal to 0.1. The smaller the thickness of the first dense layer 92, the lower the Young's modulus of the first dense layer 92, thus the effect of preventing the occurrence of crack of the sensor element 20 (particularly, crack of the first dense layer 92) is enhanced. From this point of view, the thickness of the first dense layer 92 is preferably less than or equal to 10 μm.

Note that when change from the T-phase to the M-phase occurs in the first region 77, the value of the TM ratio decreases, thus occurrence of TM transformation of zirconia due to use of the sensor element 20 may cause change in the TM ratio of the first region 77 from a value of 2 or higher to a value lower than 2. Alternatively, use of the sensor element 20 may cause change from the M-phase to the T-phase in the first region 77 to increase the value of the TM ratio, and the TM ratio of the first region 77 may change from a value lower than 2 to a value higher than or equal to 2. However, in the sensor element 20 of the present embodiment, in an unused state of the sensor element 20, in other words, in a state where the TM transformation of zirconia due to use of the sensor element 20 has not occurred, the TM ratio of zirconia in the first region 77 is lower than 2. In an unused state of the sensor element 20, the TM ratio of zirconia in the first region 77 is preferably lower than or equal to 1, and more preferably lower than or equal to 0.1. When use of the sensor element 20 causes change from the M-phase to the T-phase in the first region 77 to increase the value of the TM ratio, the first region 77 contracts, and when the first region 77 contracts, as compared to when the first region 77 expands, crack of the sensor element 20 is unlikely to occur.

Although the first inner porous layer 83 also covers the outer lead 75, the first inner porous layer 83 has a higher porosity than that of the first dense layer 92, so has a low Young's modulus, thus even when the first region 77 expands, the stress inside the first inner porous layer 83 is unlikely to increase. Therefore, even when the zirconia in the second region 78 expands due to TM transformation, crack of the first inner porous layer 83 is unlikely to occur.

The measurement-object gas may contain water (water or sulfuric acid dissolved in water), and the water may move within the porous layer 80 due to capillary action. When the water reaches the upper, lower connector electrodes 71, 72, there is a possibility that rust or corrosion may occur in the upper, lower connector electrodes 71, 72, and/or the contact metal fittings 52 of the connector 50 in contact with the upper, lower connector electrodes 71, 72. However, in the gas sensor 10 of the present embodiment, even when water in the measurement-object gas moves toward the back-end side of the sensor element 20 (the element body 60) within the porous layer 80 (particularly, within the first inner porous layer 83 and within the second inner porous layer 84) due to capillary action, the water reaches the first, second dense layers 92, 96 before reaching the upper, lower connector electrodes 71, 72. Since the first, second dense layers 92, 96 are denser than the first, second inner porous layers 83, 84, capillary action of water along the longitudinal direction of the element body 60 is unlikely to occur. As a result, water is prevented from moving to the back-end side of the sensor element 20 with respect to the first, second dense layers 92, 96 and reaching the upper, lower connector electrodes 71, 72.

At this time, since the porosity of the first region 77 covered by the first dense layer 92 is less than or equal to 40%, movement of water inside the first region 77 can prevent the water from coming around the first dense layer 92 and moving to the back-end side of the sensor element 20 with respect to the first dense layer 92. Thus, water can be prevented from reaching the upper connector electrodes 71. Furthermore, when the porosity of the first region 77 is less than 15%, water can be further prevented from moving through the inside of the first region 77, thus it is possible to further prevent water from reaching the upper connector electrodes 71.

The first, second dense layers 92, 96 are each disposed to overlap with the inner peripheral surface of the insulator 44b in the position of the sensor element 20 (the element body 60) along the longitudinal direction, thus water can be prevented from coming around the first, second dense layers 92, 96 from the outside of the sensor element 20, and moving to the back-end side of the sensor element 20. For example, as a comparative embodiment, a case is considered where the first, second dense layers 92, 96 are each disposed to overlap with the inner peripheral surface of the compact 45a of FIG. 1 in the position of the sensor element 20 along the longitudinal direction. As mentioned above, the compact 45a is obtained by press-molding powder, and has water-absorbing properties. Thus, in the comparative embodiment, movement of water in the compact 45a may cause the water to come around the first, second dense layers 92, 96 from the outside of the sensor element 20, and move to the back-end side with respect to the first, second dense layers 92, 96. In contrast, in the sensor element 20 of the present embodiment, as illustrated in FIG. 1, the first, second dense layers 92, 96 are each disposed to overlap with the inner peripheral surface of the insulator 44b in the position of the sensor element 20 along the longitudinal direction, and the insulator 44b is dense. Thus, water can be prevented from coming around the multiple first, second dense layers 92, 96 from the outside of the sensor element 20, and moving to the back-end side of the sensor element 20. Thus, water can be prevented from reaching the upper, lower connector electrodes 71, 72. The correspondence relationship between the components of the present embodiment and the components of the present invention will now be clarified. The sensor element 20 of the present embodiment corresponds to a sensor element of the present invention, the element body 60 corresponds to an element body, the first face 60a corresponds to a lateral face, the outer electrode 64 corresponds to an outer electrode, the upper connector electrode 71 (71b) corresponds to a connector electrode, the outer lead 75 corresponds to an outer lead section, the first dense layer 92 corresponds to a dense layer, and the first region 77 corresponds to a first region. In addition, the second region 78 corresponds to a second region.

In the sensor element 20 of the present embodiment described in detail above, the outer lead 75 has the first region 77 which is covered at least in part by the first dense layer 92. The first region 77 contains zirconia, and the TM ratio of zirconia is lower than 2. The first dense layer 92 has a thickness less than 11 μm. Because of these, the occurrence of crack of the sensor element 20 can be prevented.

Since the TM ratio of the first region 77 is lower than or equal to 1, the effect of preventing the occurrence of crack of the sensor element 20 is more reliably obtained. With the TM ratio of the first region 77 lower than or equal to 0.1, the occurrence of crack of the sensor element 20 can be further prevented.

In addition, with the thickness of the first dense layer 92 less than or equal to 10 μm, the effect of preventing the occurrence of crack of the sensor element 20 is more reliably obtained.

The present invention is not limited to the embodiment described above. It will be appreciated that the present invention can be implemented in various forms so long as they fall within the technical scope of the invention.

Figure 7:
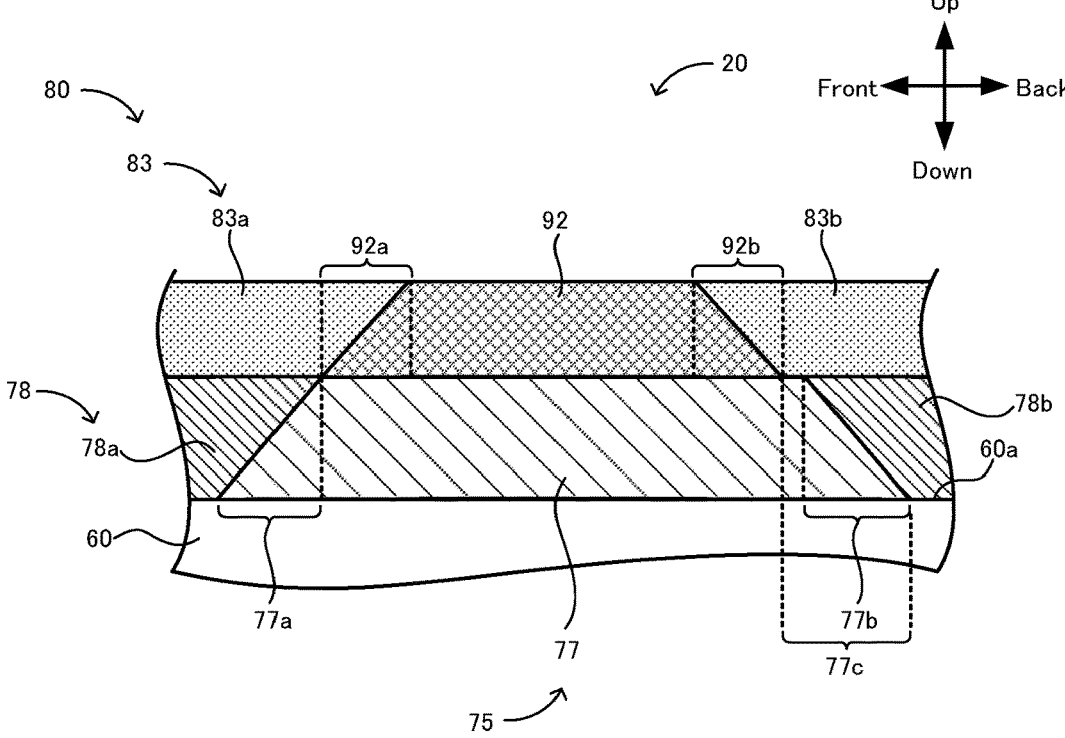
FIG. 7 is a cross-sectional view illustrating the periphery of a first dense layer 92 and a first region 77 in a modification.

For example, in the contact portion between the first dense layer 92 and the first inner porous layer 83 illustrated in FIG. 5 of the above-described embodiment, there is no overlapping section between the first dense layer 92 and the first inner porous layer 83 in the thickness direction of the first dense layer 92, i.e., in the up-down direction. However, without being limited to this, the first dense layer 92 may have an overlapping section at a portion in contact with the first inner porous layer 83, the overlapping section overlapping with the first inner porous layer 83 in the thickness direction of the first dense layer 92. FIG. 7 is a cross-sectional view illustrating the periphery of a first dense layer 92 and a first region 77 in a modification. In FIG. 7, the first dense layer 92 and the first inner porous layer 83 overlap in part with each other in the thickness direction of the first dense layer 92, i.e., in the up-down direction. Thus, the first dense layer 92 has an overlapping section 92a which is part of the front-end side of the first dense layer 92, and an overlapping section 92b which is part of the back-end side. The overlapping section 92a is a section of the first dense layer 92, the section overlapping with the back end of the front-end side portion 83a of the first inner porous layer 83 in the up-down direction, and the upper face of the overlapping section 92a is in contact with the front-end side portion 83a. The upper face of the overlapping section 92a is inclined with respect to the front-back direction, and the overlapping section 92a has a shape such that the closer to the front end thereof, the smaller the thickness. The overlapping section 92b is a section of the first dense layer 92, the section overlapping with the front end of the back-end side portion 83b of the first inner porous layer 83 in the up-down direction, and the upper face of the overlapping section 92b is in contact with the back-end side portion 83b. The upper face of the overlapping section 92b is inclined with respect to the front-back direction, and the overlapping section 92b has a shape such that the closer to the back end thereof, the smaller the thickness. In FIG. 7, the first region 77 and the second region 78 also overlap in part with each other in the thickness direction of the first region 77, i.e., in the up-down direction. Thus, the first region 77 has an overlapping section 77a which is part of the front-end side of the first region 77, and an overlapping section 77b which is part of the back-end side. The overlapping section 77a is a section of the first region 77, the section overlapping with the back end of the front-end side portion 78a of the second region 78 in the up-down direction, and the upper face of the overlapping section 77a is in contact with the front-end side portion 78a. The upper face of the overlapping section 77a is inclined with respect to the front-back direction, and the overlapping section 77a has a shape such that the closer to the front end thereof, the smaller the thickness. The overlapping section 77b is a section of the first region 77, the section overlapping with the front end of the back-end side portion 78b of the second region 78 in the up-down direction, and the upper face of the overlapping section 77b is in contact with the back-end side portion 78b. The upper face of the overlapping section 77b is inclined with respect to the front-back direction, and the overlapping section 77b has a shape such that the closer to the back end thereof, the smaller the thickness. Such overlapping sections 77a, 77b, 92a, 92b may be formed due to, for example, manufacturing reasons of the sensor element 20. For example, in the above-described manufacturing method for the sensor element 20, when a pattern for the first region 77 of the outer lead 75 is formed, then a pattern for the second region 78 is formed by screen printing, the overlapping sections 77a, 77b are formed by portions of the front and the back of the first region 77 being covered by the second region 78 from the outer side (upper side) of the sensor element 20 as in FIG. 7. Similarly, when a pattern for the first dense layer 92 is formed, then a pattern for the first inner porous layer 83 is formed by screen printing, the overlapping sections 92a, 92b are formed as in FIG. 7.

Figure 8:
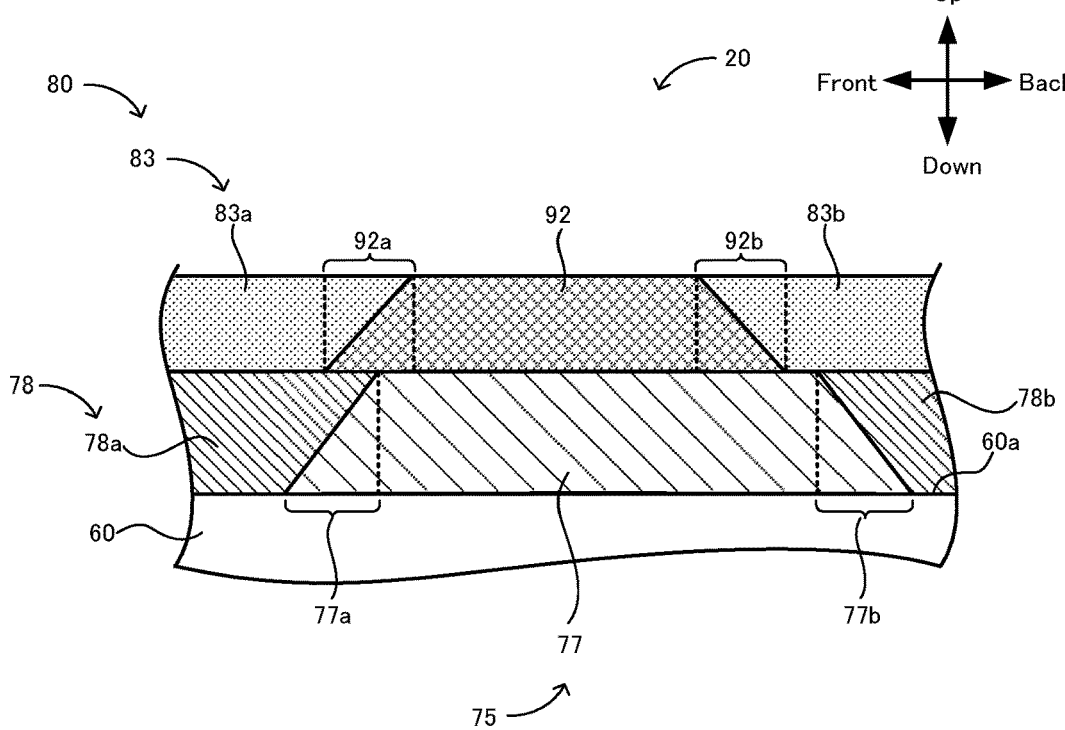
FIG. 8 is a cross-sectional view illustrating the periphery of a first dense layer 92 and a first region 77 in a modification.

Even when the overlapping sections 77a, 77b, 92a, 92b are provided as in FIG. 7, the outer lead 75 has the first region 77 which is covered by the first dense layer 92 and has a TM ratio of zirconia lower than 2, and the thickness of the first dense layer 92 is less than 11 μm, thus the occurrence of crack of the sensor element 20 can be prevented as in the above-described embodiment. At this time, the first dense layer 92 preferably covers only the first region 77 between the first region 77 and the second region 78 over a length from the front-end side to the back-end side of the first dense layer 92 including the overlapping sections 92a, 92b. In other words, it is preferable that the second region 78 be not present immediately under the first dense layer 92 over a length from the front end to the back end of the first dense layer 92 in FIG. 7. In FIG. 7, the front-end position of the overlapping section 92a and the back-end position (=the back-end position of the front-end side portion 78a of the second region 78) of the overlapping section 77a are at the same position in the front-back direction, thus the front-end side portion 78a of the second region 78 is not present immediately under the overlapping section 92a. The front-end position (=the front-end position of the back-end side portion 78b of the second region 78) of the overlapping section 77b is backward of the back-end position of the overlapping section 92b, thus the back-end side portion 78b of the second region 78 is not present immediately under the overlapping section 92b. Because of these, the second region 78 is not present immediately under the first dense layer 92 over a length from the front end to the back end of the first dense layer 92. Thus, the effect of preventing the occurrence of crack of the sensor element 20 is more reliably obtained by the first region 77. For example, as illustrated in FIG. 8, part of the front-end side portion 78a of the second region 78 may be present immediately under the overlapping section 92a of the first dense layer 92, in other words, the overlapping section 92a and the overlapping section 77a may be in an overlapping form in part in the up-down direction. As in FIG. 7 rather than the form in FIG. 8, it is preferable that the second region 78 be not present immediately under the first dense layer 92 over a length from the front end to the back end of the first dense layer 92. When the second region 78 is not present immediately under the first dense layer 92 over a length from the front end to the back end of the first dense layer 92, even when the TM ratio of the second region 78 is not lower than 2, the effect of preventing the occurrence of crack of the sensor element 20 is obtained, thus the degree of freedom in designing the second region 78 is increased. For example, the degree of freedom in designing the TM ratio of the second region 78, and the degree of freedom in designing the material for the second region 78 are increased. Even when the overlapping sections 77a, 77b, 92a, 92b are not present, the first dense layer 92 preferably covers only the first region 77 between the first region 77 and the second region 78 over a length from the front-end side to the back-end side of the first dense layer 92. For example, the first dense layer 92 illustrated in FIG. 5 covers only the first region 77 between the first region 77 and the second region 78.

Figure 9:
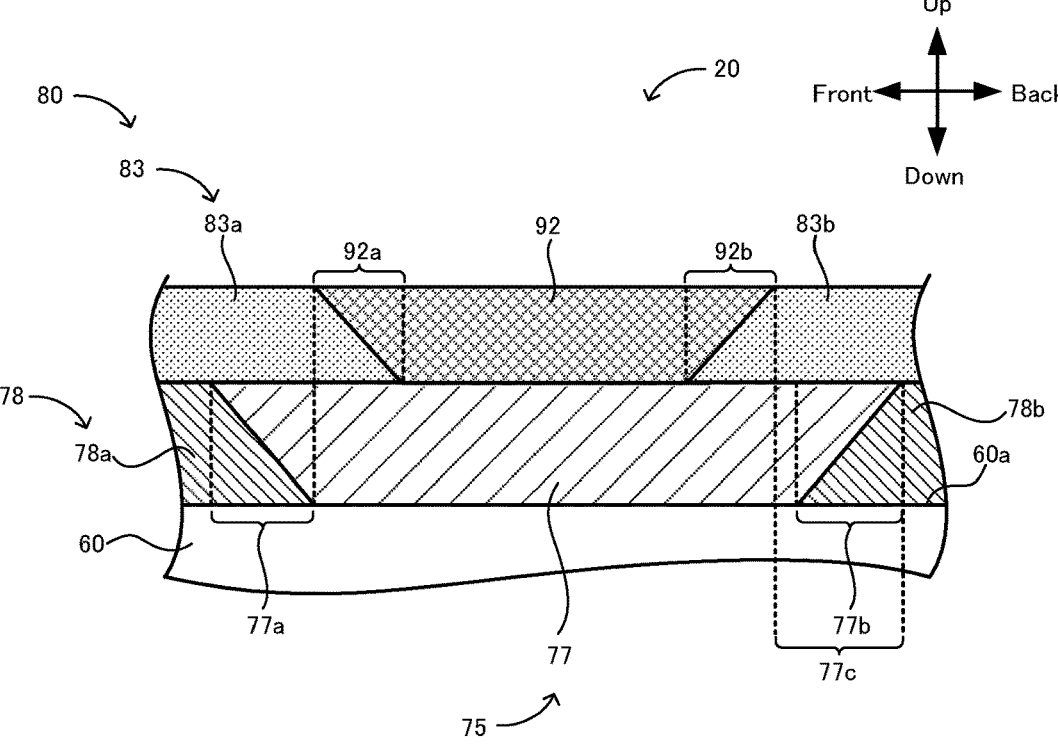
FIG. 9 is a cross-sectional view illustrating the periphery of a first dense layer 92 and a first region 77 in a modification.
Figure 10:
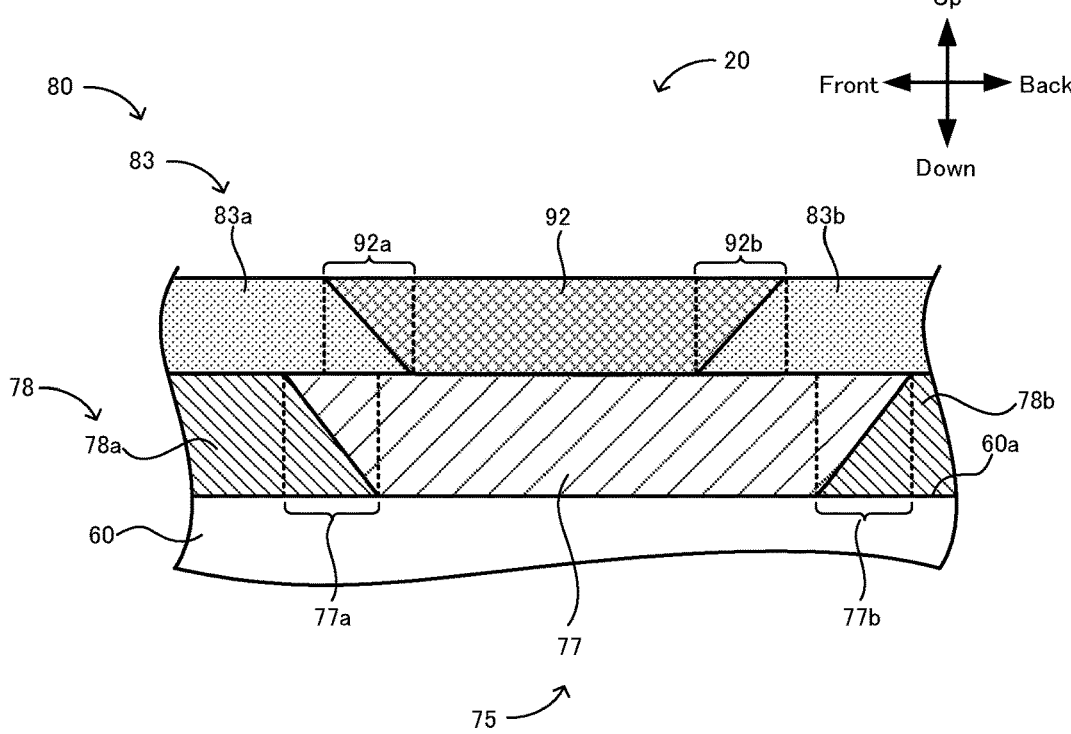
FIG. 10 is a cross-sectional view illustrating the periphery of a first dense layer 92 and a first region 77 in a modification.

In FIG. 7, the first dense layer 92 and the first inner porous layer 83 overlap in part with each other so that the first inner porous layer 83 is located above; however, without being limited to this, both layers may overlap in part with each other so that the first dense layer 92 is located above the first inner porous layer 83. The same applies to the overlapping up-down relationship between the second region 78 and the first region 77. For example, FIG. 9 is a cross-sectional view when the overlapping up-down relationship between the first dense layer 92 and the first inner porous layer 83 is reversed, and the overlapping up-down relationship between the second region 78 and the first region 77 is reversed in FIG. 7. Similarly, FIG. 10 is a cross-sectional view when the overlapping up-down relationship in FIG. 8 is reversed. In FIG. 9 and FIG. 10, the same components as in FIG. 7 and FIG. 8 are labeled with the same symbol, and a detailed description is omitted. In FIG. 10, the lower face of the first dense layer 92 does not overlap with the overlapping section 77a of the first region 77 in the up-down direction; however, the overlapping section 92a of the first dense layer 92 overlaps in part with the overlapping section 77a of the first region 77 in the up-down direction. In other words, in FIG. 10, as in FIG. 8, part of the front-end side portion 78a of the second region 78 is present immediately under the overlapping section 92a of the first dense layer 92. In contrast, in FIG. 9, the overlapping section 92a of the first dense layer 92 does not overlap with the overlapping section 77a of the first region 77 in the up-down direction. In other words, in FIG. 9, as in FIG. 7, the front-end side portion 78a of the second region 78 is not present immediately under the overlapping section 92a of the first dense layer 92. Thus, in FIG. 9, the second region 78 is not present immediately under the first dense layer 92 over a length from the front end to the back end of the first dense layer 92. Therefore, the configuration of FIG. 9 is more preferable than the configuration of FIG. 10.

In the above-described embodiment, the first region 77 illustrated in FIG. 5 does not have a protruding portion which protrudes from the first dense layer 92 to the front-end side and/or the back-end side; however, the first region 77 may have a protruding portion. In other words, the first region 77 may be covered at least in part by the first dense layer 92. For example, in the first region 77 of FIG. 7 and FIG. 9, the overlapping section 77a protrudes from the first dense layer 92 to the front-end side, and the overlapping section 77a corresponds to a protruding portion. The first region 77 of FIG. 7 and FIG. 9 has a region 77c which protrudes from the first dense layer 92 to the back-end side. The region 77c includes the overlapping section 77b, and the region between the overlapping section 92b and the overlapping section 77b in the front-back direction. The region 77c also corresponds to a protruding portion. Like this, even when the first region 77 has protruding portions (the overlapping section 77a, the region 77c), the outer lead 75 has the first region 77 which is covered by the first dense layer

92 and has a TM ratio of zirconia lower than 2, and the thickness of the first dense layer 92 is less than 11 μm, thus the occurrence of crack of the sensor element 20 can be prevented as in the above-described embodiment.

In the above-described embodiment, the outer lead 75 has the first region 77 which has a TM ratio lower than 2, and the second region 78 which has a TM ratio different from that of the first region 77; however, the TM ratio of the second region 78 may be the same as the TM ratio of the first region 77. For example, the outer lead 75 may not have the second region 78, and the entire outer lead 75 may be configured as the first region 77.

In the above-described embodiment, the first inner porous layer 83 of the sensor element 20 covers the first face 60a excluding the region where the upper connector electrodes 71 and the first dense layer 92 are present, but is not limited thereto. For example, the first inner porous layer 83 may cover the region from the front end of the first face 60a to the front end of the upper connector electrodes 71 of the first face 60a or to a predetermined position forward of the front-end. Also, of the first inner porous layer 83, a gap region (region where neither a porous layer nor a dense layer is present) may be provided between the front-end side portion 83a and the first dense layer 92 and/or between the back-end side portion 83b and the first dense layer 92. Alternatively, the first inner porous layer 83 may not include the back-end side portion 83b, and the region between the first dense layer 92 and the upper connector electrodes 71 may serve as a gap region. The outer lead 75 may be exposed to space where a gap region is provided. In addition, the first inner porous layer 83 may not include the front-end side portion 83a, the porous layer 80 may not include the outer porous layer 85, and the sensor element 20 may not include the porous layer 80.

In the above-described embodiment, the first dense layer 92 overlaps with the insulator 44b in the position in the front-back direction, but is not limited thereto. For example, the first dense layer 92 may overlap with the insulator 44a or the insulator 44c in the position in the front-back direction.

In the above-described embodiment, the element body 60 is in a rectangular parallelepiped shape, but is not limited thereto. For example, the element body 60 may have a tubular shape or a cylindrical shape. In this case, the element body 60 has only one lateral face.

In the above-described embodiment, the gas sensor 10 includes two compacts 45a, 45b, and three insulators 44a to 44c, but may include one or a plurality of compacts, and a plurality of insulators (dense bodies). For example, a configuration with the insulator 44b removed from the gas sensor 10 may be adopted. In this case, the compacts 45a, 45b are configured to be adjacent to each other in the front-back direction, thus the compacts 45a, 45b may be integrated.

EXAMPLES

Hereinafter, an example in which a sensor element is specifically produced will be described as an example. Experimental Examples 2 to 6, 9, 11, 12 correspond to examples of the present invention, and Experimental Examples 1, 7, 8, 10 correspond to Comparative Examples. Note that the present invention is not limited to the following examples.

Experimental Examples 1 to 12

Respective sensor elements were produced by the same manufacturing method for the gas sensor 10 in FIG. 1 to FIG. 5 and FIG. 7 to provide Experimental Examples 1 to 12. The dimensions of the element bodies 60 of these sensor elements 20 are such that the length is 52.5 mm, the width is 4.25 mm, and the thickness is 1.45 mm. The first dense layer 92 is assumed to have length Le1 of 5 mm, and a porosity of 0%. The outer lead 75 is assumed to have a line width of 0.4 mm, and a line thickness of 15 μm. In Experimental Examples 1 to 12, the TM ratios of the first region 77 and the second region 78 of the outer lead 75, and the thickness of the first dense layer 92 were changed in various ways as illustrated in Table 1. The TM ratio of each of the first region 77 and the second region 78 was adjusted by adjusting the ratio B/A of the content ratio B (mol %) of yttrium oxide to the content ratio A (mol %) of zirconia in the above-described slurry to form the wire pattern for each of the first region 77 and the second region 78, or adjusting the firing temperature of the unfired element body.

[Measurement of TM Ratio]

For each sensor element 20 of Experimental Examples 1 to 12, the TM ratios of the first region 77 and the second region 78 were measured by the above-described method. A Raman spectrum was measured with the operating software LabSpec using the laser Raman spectrometer, LabRAM ARAMIS manufactured by HORIBA, Ltd. The optical system is Zernitana type spectroscopic system using a backscattering method, and a semiconductor excitation solid-state laser (DPSS, 532 nm) was used as a light source. Before measurement of a sample, calibration was performed using a Si wafer. The measurement of a Raman spectrum was performed with Hole (confocal hole diameter) of 400 μm, the center wave number of the spectroscope of 520 cm$^{-1}$, Slit of 100 μm, Grating of 1800 gr/mm, and an objective lens of 100 times. For measurement, Duoscan mode was used, and the measurement range was set to 15×15 μm. However, when a layer other than the lead is in the measurement range, the measurement range was adjusted according to the thickness of the lead. The measurement points for the TM ratio of the first region 77 are such that for each of positions, one position immediately under the center of the first dense layer 92 in the front-back direction, and two positions immediately under both ends in the front-back direction, three points with an interval of 50 μm on the right and left provide the measurement points so that the total of nine measurement points are given. The TM ratio is calculated for each of the nine measurement points, and the average value is set as the TM ratio of the first region 77. The measurement points for the TM ratio of the second region 78 are such that for each of the position near the first region 77 of the front-end side portion 78a, and the position near the first region 77 of the back-end side portion 78b, three points with an interval of 50 μm on the right and left provide the measurement points so that the total of six measurement points are given. The TM ratio is calculated for each of the six measurement points, and the average value is set as the TM ratio of the second region 78. The TM ratios of the first region 77 and the second region 78 in each of measured Experimental Examples 1 to 12 are shown in Table 1.

TABLE 1

| | TM ratio of outer lead | | Thickness of first | Evaluation |
| | First region | Second region | dense layer [μm] | of crack test |
|---|---|---|---|---|
| Experimental Example 1 | 1 | 1 | 11 | F |
| Experimental Example 2 | 1 | 1 | 10 | B |
| Experimental Example 3 | 0.9 | 0.9 | 9 | B |
| Experimental Example 4 | 0.1 | 0.1 | 10 | A |

TABLE 1-continued

| | TM ratio of outer lead | | Thickness of first | Evaluation |
| | First region | Second region | dense layer [μm] | of crack test |
|---|---|---|---|---|
| Experimental Example 5 | 0.01 | 0.01 | 10 | A |
| Experimental Example 6 | 0.01 | 0.01 | 9 | A |
| Experimental Example 7 | 0.01 | 0.01 | 11 | F |
| Experimental Example 8 | 2 | 2 | 9 | F |
| Experimental Example 9 | 1 | 0.01 | 9 | B |
| Experimental Example 10 | 2 | 0.01 | 9 | F |
| Experimental Example 11 | 0.01 | 2 | 9 | A |
| Experimental Example 12 | 0.01 | 1 | 9 | A |

[Crack Test]

For each sensor element 20 in Experimental Examples 1 to 12, a test to evaluate crack resistance was conducted. Specifically, 20 units of the sensor element 20 in Experimental Example 1 were prepared, and placed in an autoclave in saturated water vapor at a temperature of 180° C. and were left for seven hours in total to promote TM transformation of the zirconia in the outer lead 75. At the two timings after lapse of five hours and after lapse of seven hours since the 20 units were placed in an autoclave for the first time, it was visually checked using an optical microscope whether crack has occurred in the 20 units of the sensor element 20, and the number of units of the sensor element 20 in which crack has occurred was counted. At the time after lapse of five hours, the number of units of the sensor element 20 in which crack has occurred was set as a first crack number, and the ratio of the first crack number to the 20 units of the sensor element 20 was calculated as a first crack rate. At the time after lapse of seven hours, the number of units (including the first crack number) of the sensor element 20 in which crack has occurred was set as a second crack number, and the ratio of the second crack number to the 20 units of the sensor element 20 was calculated as a second crack rate. For each sensor element 20 in Experimental Examples 2 to 12, the first crack rate and the second crack rate were calculated similarly. The first crack rate in Experimental Example 1 was set to a reference value, and when the second crack rate was less than the reference value in Experimental Examples 1 to 12, determination of excellent (A) was made, when the second crack rate was higher than or equal to the reference value, and the first crack rate was less than the reference value, determination of good (B) was made, and when the first crack rate was higher than or equal to the reference value, determination of fail (F) was made.

As seen from Table 1, in each of Experimental Examples 2 to 6, 9, 11, 12 in which the TM ratio of the first region 77 of the outer lead 75 is lower than 2, and the thickness of the first dense layer 92 is less than 11 μm, the evaluation of the crack test was excellent (A) or good (B). In contrast, in Experimental Examples 1, 7, 8, 10 in which the TM ratio of the first region 77 is higher than or equal to 2, and the thickness of the first dense layer 92 is greater than or equal to 11 μm, the evaluation of the crack test was fail (F). Based on the foregoing, when the TM ratio of the first region 77 covered by the first dense layer 92 of the outer lead 75 is lower than 2 and the thickness of the first dense layer 92 is less than 11 μm, it has been confirmed that the occurrence of crack of the sensor element 20 can be prevented. It is probable that the TM ratio of the first region 77 is preferably lower than or equal to 1, and the thickness of the first dense layer 92 is preferably less than or equal to 10 μm. Furthermore, in Experimental Examples 2 to 6, 9, 11, 12 in which the evaluation of the crack test was excellent (A) or good (B), in each of Experimental Examples 4 to 6, 11, 12 in which the TM ratio of the first region 77 is lower than or equal to 0.1, the evaluation of the crack test was excellent (A). Based on the foregoing, when the TM ratio of the first region 77 is lower than or equal to 0.1, it has been confirmed that the occurrence of crack of the sensor element 20 can be further prevented.

As seen from Table 1, from the mutual comparison between Experimental Examples 2 to 6, 9, 11, 12 in which the evaluation of the crack test was excellent (A) or good (B), in each of the cases where the TM ratio of the second region 78 of the outer lead 75 is the same as the TM ratio of the first region 77 (Experimental Examples 2 to 6), where the TM ratio of the second region 78 is lower than the TM ratio of the first region 77 (Experimental Example 9), and where the TM ratio of the second region 78 is higher than the TM ratio of the first region 77 (Experimental Examples 11, 12), when the TM ratio of the first region 77 is lower than 2 and the thickness of the first dense layer 92 is less than 11 $\mu$m, it has been confirmed that the effect of preventing the occurrence of crack of the sensor element 20 is obtained.

The present application claims priority from Japanese Patent Application No. 2023-058161 filed Mar. 31, 2023, the entire contents of which are incorporated herein by reference.

What is claimed is:

1. A sensor element for detecting a specific gas concentration in a measurement-object gas, the sensor element comprising:
 an element body having a front end and a back end which are both ends along a longitudinal direction, and a lateral face which is a surface along the longitudinal direction, wherein a front-end side is to be exposed to the measurement-object gas;
 an outer electrode disposed on the front-end side of the lateral face;
 a connector electrode disposed on a back-end side of the lateral face to be electrically connected to an outside;
 an outer lead section disposed on the lateral face to electrically connect the outer electrode and the connector electrode; and
 a dense layer disposed closer to the front-end side than the connector electrode to cover part of the lateral face,
 wherein the outer lead section has a first region which is covered at least in part by the dense layer, the first region contains zirconia, TM ratio is lower than 2, the TM ratio being a ratio Ht/Hm of a peak height Ht of T-phase to a peak height Hm of M-phase of zirconia in a Raman spectrum measured using Raman spectroscopy, and
 the dense layer has a thickness less than 11 $\mu$m.

2. The sensor element according to claim 1,
 wherein the first region has the TM ratio lower than or equal to 1.

3. The sensor element according to claim 2,
 wherein the first region has the TM ratio higher than or equal to 0.01.

4. The sensor element according to claim 3,
 wherein the dense layer has a thickness less than or equal to 10 $\mu$m.

5. The sensor element according to claim 2,
 wherein the dense layer has a thickness less than or equal to 10 $\mu$m.

6. The sensor element according to claim 1,
 wherein the first region has the TM ratio lower than or equal to 0.1.

7. The sensor element according to claim 6,
 wherein the first region has the TM ratio higher than or equal to 0.01.

8. The sensor element according to claim 7,
 wherein the dense layer has a thickness less than or equal to 10 $\mu$m.

9. The sensor element according to claim 6,
 wherein the dense layer has a thickness less than or equal to 10 $\mu$m.

10. The sensor element according to claim 1,
 wherein the first region has the TM ratio higher than or equal to 0.01.

11. The sensor element according to claim 10,
 wherein the dense layer has a thickness less than or equal to 10 $\mu$m.

12. The sensor element according to claim 1,
 wherein the dense layer has a thickness less than or equal to 10 $\mu$m.

13. The sensor element according to claim 1,
 wherein the outer lead section has the first region and a second region, and
 the dense layer covers only the first region between the first region and the second region over a length from the front-end side to the back-end side of the dense layer.

14. A gas sensor comprising the sensor element according to claim 1.

* * * * *